(12) United States Patent
Schneider et al.

(10) Patent No.: US 10,745,109 B2
(45) Date of Patent: Aug. 18, 2020

(54) ASSEMBLY OF TWO PARTS, ONE OF WHICH IS MADE OF COMPOSITE MATERIAL, THE PARTS BEING ASSEMBLED TOGETHER BY A MECHANICAL ANCHOR ELEMENT

(71) Applicant: SAFRAN AIRCRAFT ENGINES, Paris (FR)

(72) Inventors: Julien Schneider, Moissy-Cramayel (FR); Johann Feunteun, Moissy-Cramayel (FR); Thierry Godon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 183 days.

(21) Appl. No.: 15/520,975

(22) PCT Filed: Oct. 19, 2015

(86) PCT No.: PCT/FR2015/052797
§ 371 (c)(1),
(2) Date: Apr. 21, 2017

(87) PCT Pub. No.: WO2016/062952
PCT Pub. Date: Apr. 28, 2016

(65) Prior Publication Data
US 2017/0341732 A1    Nov. 30, 2017

(30) Foreign Application Priority Data
Oct. 23, 2014 (FR) ..................... 14 60200

(51) Int. Cl.
*B64C 11/26* (2006.01)
*F04D 29/02* (2006.01)
(Continued)

(52) U.S. Cl.
CPC .............. *B64C 11/26* (2013.01); *B23P 15/04* (2013.01); *B29C 65/56* (2013.01); *B29C 66/126* (2013.01);
(Continued)

(58) Field of Classification Search
CPC . F01D 5/282; F01D 5/28; F01D 5/286; Y02T 50/672; Y02T 50/673;
(Continued)

(56) References Cited

U.S. PATENT DOCUMENTS

| 5,112,194 A | 5/1992 | More |
| 6,431,837 B1 * | 8/2002 | Velicki ................... F01D 5/282 |
| | | 416/223 R |

(Continued)

FOREIGN PATENT DOCUMENTS

| EP | 1 526 285 A1 | 4/2005 |
| EP | 1 681 440 A2 | 7/2006 |

(Continued)

OTHER PUBLICATIONS

International Search Report as issued in International Patent Application No. PCT/FR2015/052797, dated Jan. 29, 2016.

(Continued)

*Primary Examiner* — Dominick L Plakkoottam
(74) *Attorney, Agent, or Firm* — Pillsbury Winthrop Shaw Pittman LLP

(57) ABSTRACT

An assembly of two parts, one of the parts being made of composite material with fiber reinforcement obtained from a fiber preform made by three-dimensional weaving and densified with a matrix, the assembly including a mechanical anchor element secured to one of the parts and inserted inside the other part.

10 Claims, 2 Drawing Sheets

(51) Int. Cl.
| | | |
|---|---|---|
| *F04D 29/38* | (2006.01) | |
| *F16B 5/12* | (2006.01) | |
| *F01D 5/28* | (2006.01) | |
| *F04D 29/32* | (2006.01) | |
| *B29C 65/00* | (2006.01) | |
| *B29C 65/56* | (2006.01) | |
| *B23P 15/04* | (2006.01) | |
| *B29C 65/48* | (2006.01) | |
| *B29L 31/08* | (2006.01) | |
| *B29C 65/64* | (2006.01) | |

(52) U.S. Cl.
CPC ............ *B29C 66/21* (2013.01); *B29C 66/301* (2013.01); *B29C 66/72141* (2013.01); *F01D 5/282* (2013.01); *F01D 5/286* (2013.01); *F04D 29/023* (2013.01); *F04D 29/324* (2013.01); *F04D 29/388* (2013.01); *F16B 5/128* (2013.01); *B29C 65/4835* (2013.01); *B29C 65/64* (2013.01); *B29C 66/71* (2013.01); *B29C 66/7394* (2013.01); *B29L 2031/082* (2013.01); *B29L 2031/087* (2013.01); *F05D 2230/23* (2013.01); *F05D 2240/303* (2013.01); *F05D 2300/603* (2013.01); *Y02T 50/672* (2013.01); *Y02T 50/673* (2013.01)

(58) Field of Classification Search
CPC ... B29C 70/467; B29C 70/48; B29C 65/4835; B29C 65/64; B29C 66/7394; B29C 66/71; B29C 70/68; B29C 66/72141; B29C 66/301; B29C 66/21; B29C 65/56; B29C 66/126; B64C 11/26; F04D 29/324; F04D 29/388; F04D 29/023; B23P 15/04; F16B 5/128; B29L 2031/087; B29L 2031/082; F05D 2230/23; F05D 2240/303; F05D 2300/603

See application file for complete search history.

(56) References Cited

U.S. PATENT DOCUMENTS

| | | | |
|---|---|---|---|
| 2006/0216154 A1* | 9/2006 | McMillan | F01D 5/282 416/241 R |
| 2012/0267039 A1* | 10/2012 | Dambrine | B29C 70/48 156/148 |
| 2013/0017093 A1* | 1/2013 | Coupe | B64C 11/26 416/230 |
| 2013/0270389 A1* | 10/2013 | Godon | B29C 70/222 244/54 |
| 2016/0159460 A1* | 6/2016 | Laurenceau | B29D 99/0025 416/226 |

FOREIGN PATENT DOCUMENTS

| | | |
|---|---|---|
| FR | 2 963 055 A1 | 1/2012 |
| WO | WO 2013/021141 A1 | 2/2013 |

OTHER PUBLICATIONS

Office Action as issued in European Patent Application No. 15798499.8, dated Jul. 14, 2020.

* cited by examiner

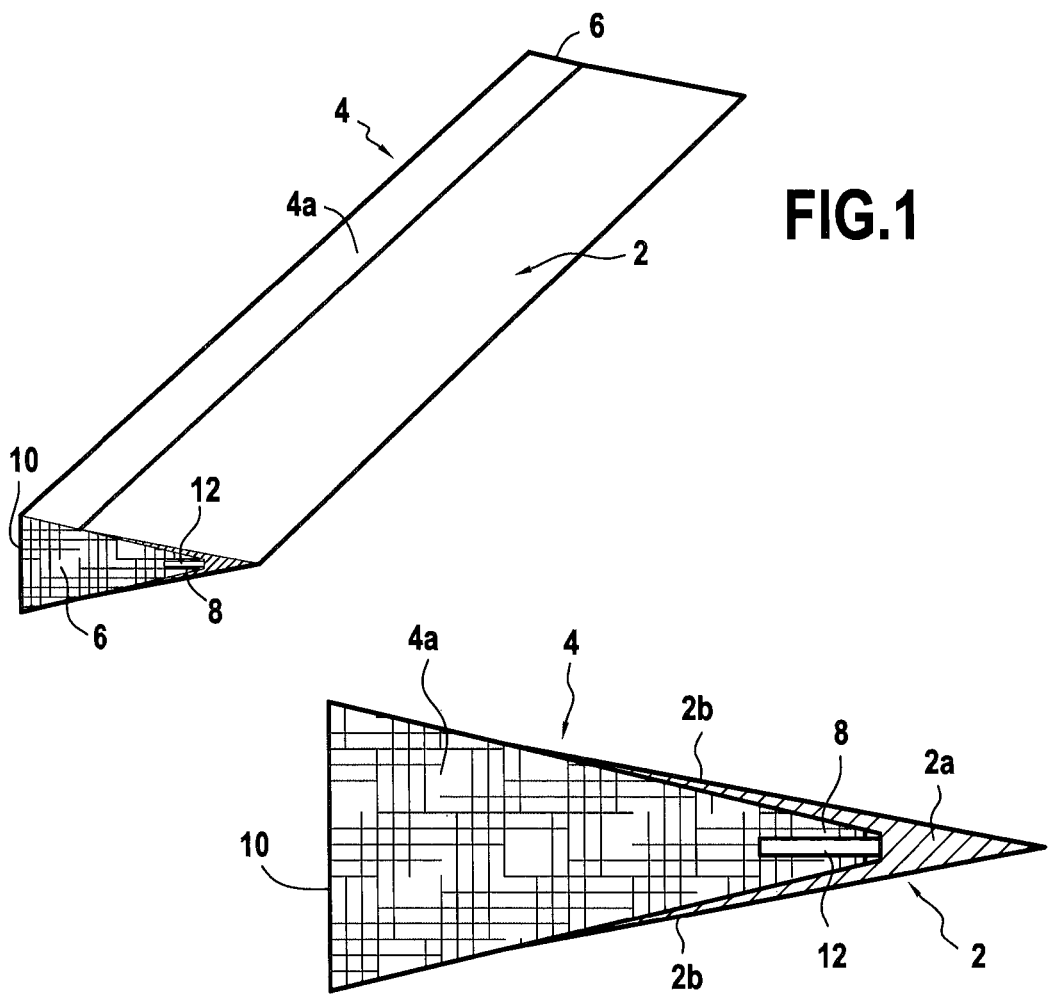
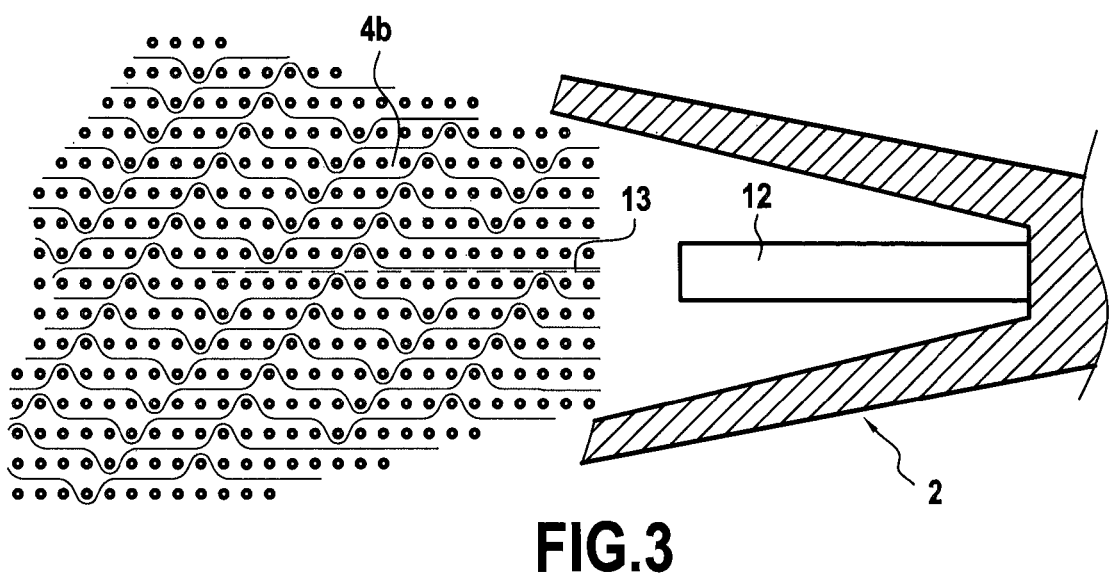

ASSEMBLY OF TWO PARTS, ONE OF WHICH IS MADE OF COMPOSITE MATERIAL, THE PARTS BEING ASSEMBLED TOGETHER BY A MECHANICAL ANCHOR ELEMENT

CROSS REFERENCE TO RELATED APPLICATIONS

This application is the U.S. National Stage of PCT/FR2015/052797 filed Oct. 19, 2015, which in turn claims priority to French Application No. 1460200, filed Oct. 23, 2014. The contents of both applications are incorporated herein by reference in their entirety.

BACKGROUND OF THE INVENTION

The invention relates to the general field of assembling together two parts of a structure in which one of the parts is made of composite material with fiber reinforcement obtained from a fiber preform made by three-dimensional weaving and densified with a matrix.

Non-limiting examples of applications of the invention include in particular assembling a metal strip on a leading edge of a turbojet blade made of composite material, and assembling a shell on a spar-forming structural core made of composite material for a turboprop propeller blade.

It is known to make a turbojet blade out of composite material by using fiber reinforcement obtained from a fiber preform made by three-dimensional weaving and densified with a matrix. Compared with other known techniques for fabricating a composite material blade, making a fiber preform by three-dimensional weaving presents numerous advantages, in particular such as that of not needing any recourse to inserts or fitting any other separate element. Reference made by made to Document EP 1 526 285, which describes a method of fabricating such a fan blade.

Furthermore, it is known to fit a metal strip (or reinforcement) on the leading edge of such a composite material turbojet blade in order to protect the composite structure from abrasion/erosion and also in the event of an impact against a foreign body. This applies in particular for the fan blades of a turbojet, which are exposed to ingesting a bird, hail, ice, etc.

Typically, the metal strip, which by way of example is made by mechanical techniques such as stamping, forming, or electroforming, is adhesively bonded on the leading edge of the composite material blade by means of a bead of adhesive. That operation can be performed in a mold used for bonding the metal strip, or in a stove in order to cure the bead of adhesive that is applied on the strip, if any.

Assembling metal strip on the leading edge of a composite material blade in that way presents numerous drawbacks. In particular, when the blade is subjected to deformation in its chord direction or in its length direction, the local warping of the unit subjects the bead of adhesive to significant traction and tearing forces, which can cause the flanges of the metal strip to become unstuck. Unfortunately, once those flanges have become unstuck, the inertia of the metal strip under the effect of centrifugal force causes the strip to be ejected outwards.

Providing the strip with local reinforcement can then constitute a solution for limiting propagation of any unsticking, but the solutions that have been proposed, such as drilling and machining the airfoil and the strip in order to pass a mechanical fastener through them, give rise to an additional operation and damage the airfoil locally. Furthermore, the position zones of the strip need to be highly aerodynamic, which requires the means for assembling the strip to fit as closely as possible to the shape of the strip. Unfortunately, with fan blades having shapes that are ever more complex, this constraint becomes difficult to satisfy when using the assembly solutions of the prior art.

OBJECT AND SUMMARY OF THE INVENTION

There thus exists a need to have an assembly that does not present the above-mentioned drawbacks.

In accordance with the invention, this object is achieved by an assembly of two parts, one of the parts being made of composite material with fiber reinforcement obtained from a fiber preform made by three-dimensional weaving and densified with a matrix, the assembly being characterized in that it includes a mechanical anchor element secured to one of the parts and inserted inside the other part.

The invention is remarkable in that the mechanical anchor element that becomes inserted inside the composite material part serves to increase significantly the area of adhesive bonding between the two parts. As a result, the strength of assembly between the two parts can be considerably reinforced. In particular, when a metal strip is assembled on the leading edge of a composite material blade, it is possible to adapt the position of the mechanical anchor element as a function of the levels of shear stress in the blade. Finally, the assembly is remarkable in that it does not require the composite material part to be drilled, with the mechanical anchor element merely being inserted between the fibers of the composite material part. Any degradation of the composite material part can thus be avoided.

The mechanical anchor element is inserted in a zone of non-interlinking provided during weaving of the fiber preform that is to make the fiber reinforcement of the composite material part.

In addition, the mechanical anchor element is inserted in the zone of non-interlinking in the fiber preform prior to a step of injecting a resin into said fiber preform. In other words, mechanical anchoring is performed on a fiber preform (of the composite material part) that has not yet had resin injected therein, with the preform and the other part subsequently being placed in an injection mold in order to be subjected together to the injection of resin.

In an embodiment, the composite material part is an airfoil of a turbojet blade and the other part is a metal strip for assembling on a leading edge of said airfoil.

In this embodiment, the mechanical anchor element may comprise at least one metal rod that is secured to the metal strip and that extends into the inside of the airfoil in a direction that is transverse relative to the airfoil. The rod may thus be secured to a flange of the metal strip that is positioned against a side face of the airfoil or it may be secured to a central portion of the metal strip interconnecting the flanges.

Alternatively, the mechanical anchor element may comprise at least one crossbar that extends between two flanges of the metal strip and that passes through the airfoil in its thickness direction.

In another embodiment, the composite material part is a spar-forming structural core of a turboprop propeller blade, and the other part is a shell that is positioned around the propeller blade core, said shell being made of composite material.

In this embodiment, the mechanical anchor element may comprise at least one lug secured to an inside face of the shell and inserted into the inside of the core of the propeller blade.

The invention also provides both a turbojet blade airfoil and a turboprop propeller blade comprising at least one assembly as defined above, and also a turbine engine including at least one assembly as defined above.

BRIEF DESCRIPTION OF THE DRAWINGS

Other characteristics and advantages of the present invention appear from the following description made with reference to the accompanying drawings, which show embodiments having no limiting character. In the figures:

FIGS. 1 and 2 are views of an assembly between a metal strip and a blade of composite material in an embodiment of the invention, shown respectively in perspective and in cross-section;

FIG. 3 is a diagrammatic view showing an example of a zone of non-interlinking for passing the anchor element of FIGS. 1 and 2;

DETAILED DESCRIPTION OF THE INVENTION

Figure 4:
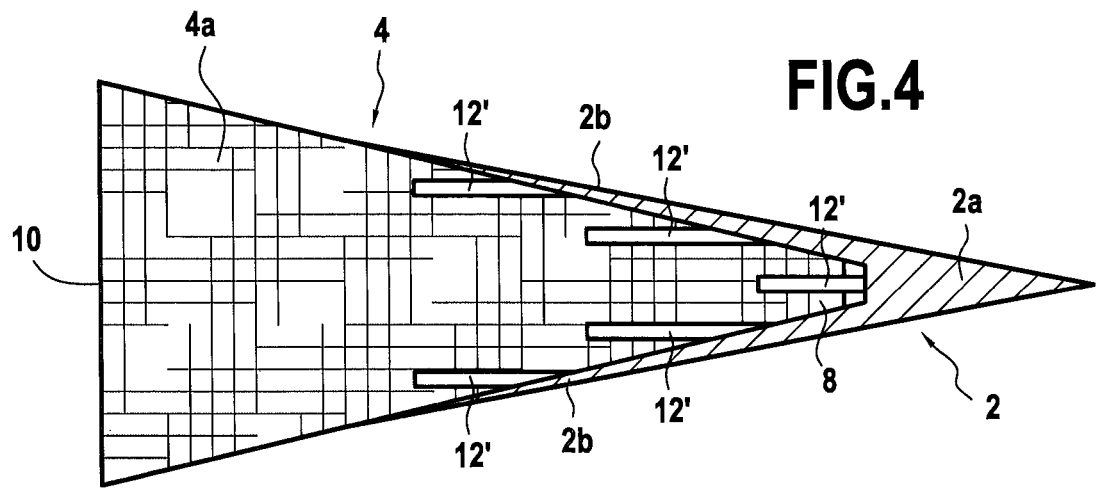
FIG. 4 is a cross-section view of an assembly between a metal strip and a blade made of composite material in another embodiment of the invention.

The invention applies to any assembly between two parts of a structure in which one of the two parts is made of composite material with fiber reinforcement obtained from a fiber preform made by three-dimensional weaving and densified with a matrix (while the other part may for example be made of metal or may be made of a composite material different from that used for the part having a fiber preform made by three-dimensional weaving).

As shown in FIGS. 1 to 5, the invention applies in particular to assembling together a metal strip 2 and a composite material blade 4 for a gas turbine engine.

The blade 4 comprises an airfoil 4a that is made of composite material comprising fiber reinforcement obtained from a fiber preform, itself made by three-dimensional weaving, and densified with a matrix. FIG. 3 shows an example three-dimensional weave for a fiber preform 4b for making such a blade airfoil.

Reference may be made to Document EP 1 526 285, which describes an embodiment of such a fiber preform by three-dimensional weaving. After shaping, the fiber preform as made in this way is put into place in an injection mold. The matrix is injected into the fiber preform while the preform is in the mold, and the preform is kept in the mold at least until it has become rigid (or consolidated).

The matrix is of a kind that is selected as a function of the intended application, for example an organic matrix obtained in particular from a polymer matrix precursor resin such as an epoxy, bismaleimide, or polyimide resin, or a carbon matrix, or a ceramic matrix. With an organic matrix, the fiber preform is impregnated with a composition containing the matrix precursor resin prior to being shaped in tooling or after being shaped, with impregnation after shaping being performed for example by infusion or by a resin transfer molding (RTM) type process. A carbon or ceramic matrix may be densified by chemical vapor infiltration (CVI) or by impregnation with a liquid composition containing a carbon or ceramic precursor resin and applying pyrolysis or ceramization heat treatment to the precursor, which methods are themselves known.

In known manner, the airfoil 4a of the blade extends longitudinally between two longitudinal ends 6, and laterally between a leading edge 8 and a trailing edge 10.

The metal strip 2, which in particular has the function of protecting the composite structure of the airfoil 4a from abrasion/erosion and also in the event of an impact against a foreign body, is assembled on the leading edge 8 of the blade airfoil by means of a mechanical anchor element.

In the embodiment of FIGS. 1 to 3, the mechanical anchor element comprises one or more metal rods 12 that are secured to the metal strip 2 and that project into the inside of the airfoil 4a in a direction that is transverse relative thereto (i.e. from the leading edge 8 towards the trailing edge 10 of the airfoil).

More precisely, as shown in FIG. 3, each metal rod 12 is preferably inserted in a zone 13 of non-interlinking that is provided while weaving the fiber preform 4b that is to make the fiber reinforcement of the airfoil. Such a zone 13 of non-interlinking is typically obtained by locally omitting interlinking between adjacent layers of yarns, thus making it possible to obtain two preform portions that are not interlinked so as to make it possible to insert a metal rod 12 for mechanically anchoring a metal strip 2 on the blade.

Advantageously, the metal rod 12 is placed in the zone 13 of non-interlinking in the fiber preform 4b prior to the step of injecting resin into said fiber preform (i.e. prior to placing the preform in the injection mold, so that the fiber preform 4b and the metal rod 12 are subjected together to the injection of resin).

As mentioned above, the mechanical anchor element may comprise one or more metal rods 12 that are secured to the metal strip 2. For example, a plurality of metal rods may be positioned at different heights along the airfoil 4a of the blade.

Likewise, as shown in FIGS. 2 and 3, these metal rods 12 may be secured to a central portion 2a of the metal strip 2 interconnecting the flanges 2b of said strip (that are to be positioned against respective side faces of the airfoil).

In a variant shown in FIG. 4, the mechanical anchor element of the metal strip 2 for anchoring in the leading edge 8 of the airfoil 4a of the blade comprises a plurality of metal rods 12', some of which are secured to the flanges 2b of the strip and one of which is secured to the central portion 2a of the strip, all of these rods 12' extending in a direction that is transverse relative to the airfoil 4a into the inside of the airfoil.

Figure 5:
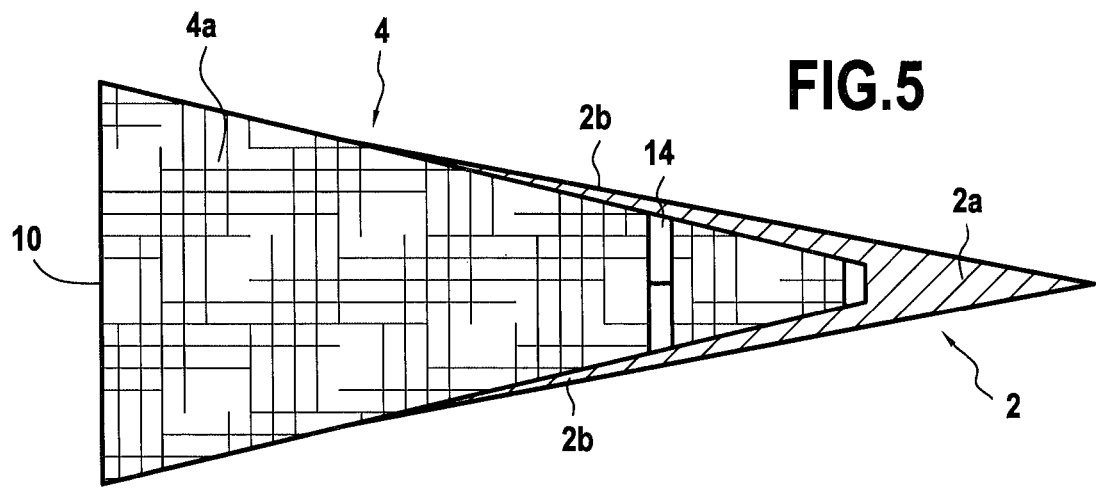
FIG. 5 is a cross-section view of an assembly between a metal strip and a blade made of composite material in yet another embodiment of the invention.

In another variant shown in FIG. 5, the element for mechanically anchoring the metal strip 2 on the leading edge 8 of the blade airfoil 4a comprises at least one crossbar 14 that extends between the two flanges 2a of the metal strip 2 and that passes through the airfoil 4a in its thickness direction.

Naturally, the mechanical anchor element may present shapes other than those described above, in particular section-member shapes serving to increase the bonding area between the two parts for assembling together.

Figure 6:
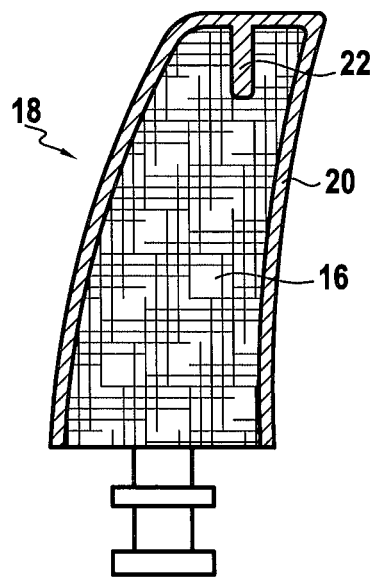
FIG. 6 is a longitudinal section view of an assembly between a structural core of a turboprop propeller blade and a shell in yet another embodiment of the invention.

FIG. 6 shows another embodiment of the invention in which the assembly is made between a structural core 16 forming the spar of a turboprop propeller blade 18 that is made of composite material and a shell 20 that is positioned around the core of the propeller blade, said shell being made of composite material, for example.

In this other embodiment, the structural core 16 forming the spar of the propeller blade 18 is made of composite material having fiber reinforcement obtained from a fiber preform made by three-dimensional weaving and densified with a matrix.

Furthermore, in this example, the mechanical anchor element for anchoring the shell 20 on the structural core 16 of the propeller blade comprises at least one lug 22 that is secured to an inside face of the shell and that becomes inserted inside the core of the propeller blade. For example, this lug 22 may be inserted in a zone of non-interlinking formed during weaving of the fiber preform that is to constitute the fiber reinforcement of the structural core 16, with this insertion taking place before the step of injecting resin into said fiber preform. Naturally, the lug may conversely be secured to the core of the propeller blade and be inserted into the inside of the shell that is made of composite material.

Furthermore, whatever the embodiment, it should be observed that the two parts are preferably assembled together while the composite material part is in the state of a non-injected fiber preform, such that the step of injecting the preform serves to provide adhesive bonding between the parts. Alternatively, the two parts could be made separately from each other and then assembled together by means of the mechanical anchor element, and finally adhesively bonded together during another operation.

The invention claimed is:

1. An assembly of two parts, one of the parts being made of composite material with fiber reinforcement obtained from a fiber preform made by three-dimensional weaving and densified with a matrix, the assembly comprising a mechanical anchor element secured to, and extending from, one of the parts and inserted inside the other part, the mechanical anchor element extending from said one of the parts being inserted in a zone of non-interlinking of said other part provided during weaving of the fiber preform that is to make the fiber reinforcement of the composite material part, with the insertion taking place before a step of injecting a resin into said fiber preform, said fiber preform comprising layers of yarns that are interlinked, wherein the zone of non-interlinking of said other part is obtained by locally omitting interlinking between adjacent layers of yarns thereby forming two separate portions of the fiber preform, wherein said one of the parts, on which the anchor element is secured, is arranged on an external surface of the other part that includes the zone of non-interlinking.

2. An assembly according to claim 1, wherein the composite material part is an airfoil of a turbojet blade and the other part is a metal strip for assembling on a leading edge of said airfoil.

3. An assembly according to claim 2, wherein the mechanical anchor element comprises at least one metal rod that is secured to the metal strip and that extends into the inside of the airfoil in a direction that is transverse relative to the airfoil.

4. An assembly according to claim 3, wherein the rod is secured to a flange of the metal strip that is positioned against a side face of the airfoil or is secured to a central portion of the metal strip interconnecting the flange.

5. An assembly according to claim 2, wherein the mechanical anchor element comprises at least one crossbar that extends between two flanges of the metal strip and that passes through the airfoil in its thickness direction.

6. An assembly according to claim 1, wherein the composite material part is a spar-forming structural core of a turboprop propeller blade, and the other part is a shell that is positioned around the propeller blade core, said shell being made of composite material.

7. An assembly according to claim 6, wherein the mechanical anchor element comprises at least one lug secured to an inside face of the shell and inserted into the inside of the structural core of the propeller blade.

8. An airfoil of a turbojet blade comprising an assembly according to claim 2.

9. A turboprop propeller blade comprising an assembly according to claim 6.

10. A turbine engine including at least one assembly according to claim 1.

* * * * *